(12) United States Patent
Goto et al.

(10) Patent No.: US 10,359,133 B2
(45) Date of Patent: Jul. 23, 2019

(54) THREADED CONNECTION FOR PIPE OR TUBE AND METHOD OF PRODUCING THE THREADED CONNECTION FOR PIPE OR TUBE

(71) Applicants: Nippon Steel & Sumitomo Metal Corporation, Tokyo (JP); Vallourec Oil and Gas France, Aulnoye-Aymeries (FR)

(72) Inventors: Kunio Goto, Tokyo (JP); Masanari Kimoto, Tokyo (JP)

(73) Assignees: Nippon Steel & Sumitomo Metal Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

(21) Appl. No.: 16/064,598

(22) PCT Filed: Dec. 16, 2016

(86) PCT No.: PCT/JP2016/087610
§ 371 (c)(1),
(2) Date: Jun. 21, 2018

(87) PCT Pub. No.: WO2017/110685
PCT Pub. Date: Jun. 29, 2017

(65) Prior Publication Data
US 2019/0003620 A1    Jan. 3, 2019

(30) Foreign Application Priority Data

Dec. 25, 2015   (JP) .................................. 2015-254026

(51) Int. Cl.
*F16L 15/04*   (2006.01)
*C25D 7/00*   (2006.01)
(Continued)

(52) U.S. Cl.
CPC .............. *F16L 15/04* (2013.01); *C23C 22/12* (2013.01); *C23C 22/18* (2013.01); *C23C 28/00* (2013.01);
(Continued)

(58) Field of Classification Search
CPC . F16L 15/04; C25D 7/00; C25D 7/003; C23C 22/18; C23C 28/00; C23C 22/12;
(Continued)

(56) References Cited

FOREIGN PATENT DOCUMENTS

| CN | 101426590 A | 5/2009 |
| CN | 101668978 A | 3/2010 |

(Continued)

*Primary Examiner* — Michael C Miggins
(74) *Attorney, Agent, or Firm* — Banner & Witcoff, Ltd.

(57) ABSTRACT

An objective of the present invention is to provide a threaded connection for pipe or tube having an excellent anti-misalignment property and an appropriate shouldering torque, and further having excellent corrosion resistance and an excellent adhesiveness of a solid lubricant coating, and to provide a method of producing the threaded connection for pipe or tube. The threaded connection for pipe or tube according to the present embodiment includes a pin and a box. The pin and the box have contact surfaces including thread portions and unthreaded metal contact portions. The threaded connection for pipe or tube comprises an alloy plating layer consisting of a Zn—Ni alloy on the contact surface of at least one of the pin and the box, a phosphating layer, and a solid lubricant coating. These are stacked in an order of the alloy plating layer, phosphating layer, and the solid lubricant coating, from a contact surface side.

5 Claims, 6 Drawing Sheets

(51) Int. Cl.
  *C23C 22/18*   (2006.01)
  *C23C 28/00*   (2006.01)
  *C23C 22/12*   (2006.01)
  *C22C 38/00*   (2006.01)
  *C22C 38/02*   (2006.01)
  *C22C 38/04*   (2006.01)
  *C22C 38/42*   (2006.01)
  *C22C 38/44*   (2006.01)

(52) U.S. Cl.
  CPC ............... *C25D 7/00* (2013.01); *C25D 7/003* (2013.01); *C22C 38/002* (2013.01); *C22C 38/02* (2013.01); *C22C 38/04* (2013.01); *C22C 38/42* (2013.01); *C22C 38/44* (2013.01)

(58) Field of Classification Search
  CPC ....... C22C 38/002; C22C 38/02; C22C 38/04; C22C 38/42; C22C 38/44
  See application file for complete search history.

(56) References Cited

FOREIGN PATENT DOCUMENTS

| | | |
|---|---|---|
| JP | H08-105582 A | 4/1996 |
| JP | 2008-215473 A | 9/2008 |
| WO | 1996/10710 A1 | 4/1996 |

THREADED CONNECTION FOR PIPE OR TUBE AND METHOD OF PRODUCING THE THREADED CONNECTION FOR PIPE OR TUBE

RELATED APPLICATIONS

This application is a National Stage Application under 35 U.S.C. 371 of co-pending PCT application PCT/JP2016/087610 designating the United States and filed Dec. 16, 2016; which claims the benefit of JP application number 2015-254026 and filed Dec. 25, 2015 each of which are hereby incorporated by reference in their entireties.

TECHNICAL FIELD

The present invention relates to a threaded connection for pipe or tube and a method of producing a threaded connection for pipe or tube, more specifically relates to a threaded connection for oil country tubular goods and a method of producing a threaded connection for oil country tubular goods.

BACKGROUND ART

For drilling an oil field or a natural gas field, oil country tubular goods are used. In proportion to the depth of a well, multiple steel pipes are connected to form the oil country tubular goods. Coupling the steel pipes is conducted by fastening threaded connections for pipe and tube formed at end portions of the steel pipes. The oil country tubular goods are drawn up and loosened for inspection or the like, and after the inspection, the oil country tubular goods are fastened again and reused.

A threaded connection for pipe or tube includes a pin and a box. The pin includes an external thread portion and an unthreaded metal contact portion formed on an outer peripheral surface of a front end portion of a steel pipe. The box includes an internal thread portion and an unthreaded metal contact portion formed on an inner peripheral surface of a front end portion of a steel pipe. The thread portions and the unthreaded metal contact portions of the pin and the box repeatedly receive strong friction in fastening (making-up) and loosening (breaking-out) steel pipes. If these portions do not have a sufficient durability against friction, galling (unrepairable seizure) occurs when fastening and loosening are repeated. Therefore, a sufficient durability against friction, namely, excellent galling resistance is needed for a threaded connection for pipe or tube.

In conventional practices, to improve galling resistance, a compound grease called dope, containing heavy metals, has been used. By applying the compound grease on the surface of a threaded connection for pipe or tube, the galling resistance of the threaded connection for pipe or tube can be improved. However, heavy metals such as Pb, Zn, and Cu contained in the compound grease may exert an influence on the environment. For this reason, the development of a threaded connection for pipe or tube not using compound grease has been desired.

Japanese Patent Application Publication No. 8-105582 (Patent Literature 1), International Application Publication No. WO1996/10710 (Patent Literature 2) and Japanese Patent Application Publication No. 2008-215473 (Patent Literature 3) propose threaded connections for pipe or tube excellent in galling resistance even without compound grease.

A threaded connection for pipe or tube described in Patent Literature 1 includes Cr content of 10% or more, and on the contact surface of a box or a pin, a nitrided layer with a thickness of 1 to 20 m and a three-layer coating are formed, wherein the three-layer coating layer is comprising of an underlying processing layer, a manganese phosphate-based chemical treated layer with a thickness of 5 to 25 m, and a solid lubricant layer with a thickness of 10 to 45 µm. The underlying processing layer is chosen from a nitrided layer with a thickness of 1 to 20 µm, an iron plating layer or an iron alloy plating layer with a thickness of 0.5 to 15 µm. Thus, Patent Literature 1 describes that, even when the number of use of the steel pipe increase, it is possible to prevent occurrence of galling of a threaded connection for pipe or tube for a long time.

On the contact surface of a box or a pin of a threaded connection for pipe or tube described in Patent Literature 2, a phosphoric chemical treatment coating layer or a nitrided layer, and a phosphoric chemical treatment coating layer are provided, and a resin coating layer is formed on the phosphoric chemical treatment coating layer, the resin coating layer being obtained by dispersing molybdenum disulfide or tungsten disulfide powder into a resin and mixing them. Furthermore, the thickness of the resin coating is equal to or larger than the thickness of the phosphoric chemical treatment coating layer. Patent Literature 2 describes that it is thereby possible to prevent the occurrence of galling in a threaded connection for a long time even if the number of repetitive uses of a steel pipe increases.

In a threaded connection for pipe or tube described in Patent Literature 3, the contact surface of at least one of a pin and a box includes a first plating layer consisting of a Cu—Zn alloy. Patent Literature 3 describes that this allows the threaded connection to have excellent leakage resistance and galling resistance and furthermore improves crevice corrosion in the case where a lubricating coating is formed on the plating layer.

To suppress galling in a threaded connection for pipe or tube, it is effective to form a plating layer containing a metal having a high hardness and a high melting point. For this reason, copper (Cu) plating or Cu-alloy plating is used in conventional practice. Cu has a high hardness and a high melting point. Therefore, Cu contained in the plating layer increases the hardness and the melting point of the plating layer as a whole. Consequently, the galling resistance of the threaded connection for pipe or tube is increased.

CITATION LIST

Patent Literature

[Patent Literature 1] Japanese Patent Application Publication No. 8-105582

[Patent Literature 2] International Application Publication No. WO1996/10710

[Patent Literature 3] Japanese Patent Application Publication No. 2008-215473

SUMMARY OF INVENTION

Technical Problem

The evaluation of galling resistance is usually conducted while steel pipes to be fastened are centered with each other. However, in actually fastening a threaded connection for pipe or tube, steel pipes (or a steel pipe and a coupling) to be fastened may not be centered with each other. This is called misalignment. When misalignment occurs, the thread portion and an unthreaded metal contact portion of a pin and a box receive strong friction as well as shear stress. This shear stress is remarkably larger compared to that in the case where no misalignment occurs. For this reason, when misalignment occurs, galling is more prone to occur. Therefore, a capability of suppressing galling even when misalignment occurs, namely, an anti-misalignment property is needed for a threaded connection for pipe or tube.

Meanwhile, the previously-described unthreaded metal contact portion includes a metal seal portion and a shoulder portion. In fastening a threaded connection for pipe or tube, the shoulder portions of a pin and a box come into contact with each other. A torque occurring at this point is called a shouldering torque. In fastening a threaded connection for pipe or tube, after the torque reaches the shouldering torque, the fastening is further performed until fastening is completed. This increases the gas-tightness of the threaded connection for pipe or tube. When the fastening is further performed, a metal constituting at least one of the pin and the box begins plastic deformation. A torque occurring at this point is called the yield torque.

A torque at the completion of fastening (called a fastening torque) is set so that a sufficient seal interfacial pressure can be obtained irrespective of the amount of thread interference. When the difference between a shouldering torque and a yield torque is sufficiently large, there is room in the range of fastening torque. As a result, the adjustment of the fastening torque becomes easy. Therefore, the shouldering torque is preferably not excessively high. In addition to the previously-described anti-misalignment property, a threaded connection for pipe or tube is required to have appropriate torque properties (the shouldering torque and the yield torque).

Meanwhile, after produced, an oil well pipe is transported by a vessel or the like and is in storage for a certain period of time until it is used. The transportation and the storage of the oil well pipe may last for a long period. Furthermore, the storage of an oil well pipe may be performed in the open-air. When the storage is performed in the open-air for a long period, rust occurs in a threaded connection for oil well pipe, and the gas-tightness and the galling resistance of the threaded connection for oil well pipe may be reduced. Therefore, in addition to the previously-described anti-misalignment property and an appropriate torque properties (the shouldering torque and the yield torque), an excellent corrosion resistance is required for a threaded connection for oil country tubular goods.

On a thread portion and an unthreaded metal contact portion, a solid lubricating coating is formed for the purpose of improving galling resistance. As previously described, when an oil well pipe is in storage in the open-air, the oil well pipe may be repeatedly exposed to high temperature and low temperature. When being repeatedly exposed to high temperature and low temperature, the adhesiveness of the solid lubricating coating may be reduced. The reduced adhesiveness of the solid lubricating coating results in the scaling-off of the solid lubricating coating in performing fastening. The scaling-off of the solid lubricating coating leads to the reduction in the anti-misalignment property of the threaded connection for pipe or tube, further resulting in an increased shouldering torque. Therefore, for a threaded connection for pipe or tube, high adhesiveness of solid lubricant coating is required even in the case of being subjected to repetitive temperature changes.

As to the previously described threaded connections for pipe or tube disclosed in Patent Literature 1 to Patent Literature 3, the galling resistance is studied, but the anti-misalignment property is not studied. Therefore, while having sufficient galling resistance, the threaded connections for pipe or tube may have low anti-misalignment properties. Furthermore, the threaded connections for pipe or tube may have excessively high shouldering torques or may have low corrosion resistance and low adhesiveness of solid lubricant coating.

An objective of the present invention is to provide a threaded connection for pipe or tube having an excellent anti-misalignment property and an appropriate shouldering torque, and further having excellent corrosion resistance and an excellent adhesiveness of a solid lubricant coating, and to provide a method of producing the threaded connection for pipe or tube.

Solution to Problem

A threaded connection for pipe or tube according to the present embodiment includes a pin and a box. The pin and the box each include a contact surface having a thread portion and an unthreaded metal contact portion. The threaded connection for pipe or tube includes, on the contact surface of at least one of the pin and the box, an alloy plating layer consisting of a Zn—Ni alloy, a phosphating layer, and a solid lubricant coating. These are stacked in an order of the alloy plating layer, the phosphating layer, and the solid lubricant coating, from a contact surface side.

A method of producing the threaded connection for pipe or tube according to the present embodiment is a method of producing a threaded connection for pipe or tube that includes a pin and a box. The pin and the box each have a contact surface including a thread portion and an unthreaded metal contact portion. The producing method according to the present embodiment includes an alloy plating layer forming step, a phosphating layer forming step, and a solid lubricant coating forming step. In the alloy plating layer forming step, an alloy plating layer consisting of a Zn—Ni alloy is formed on the contact surface of at least one of the pin and the box. In the phosphating layer forming step, a phosphating layer is formed by performing chemical treatment after forming the alloy plating layer. In the solid lubricant coating forming step, a solid lubricant coating is formed after forming the phosphating layer.

Effects of Invention

A threaded connection for pipe or tube according to the present embodiment has an excellent anti-misalignment property and an appropriate shouldering torque, and further having excellent corrosion resistance and an excellent adhesiveness of a solid lubricant coating.

DESCRIPTION OF EMBODIMENTS

Figure 1:
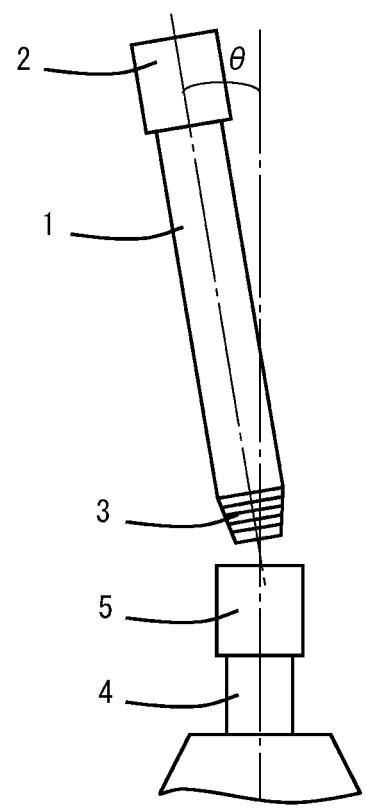
FIG. 1 is a schematic diagram of fastening of threaded connections for pipe or tube when misalignment occurs.

The present embodiment will be described below in detail with reference to the drawings. Identical or equivalent elements will be denoted by the same reference numerals and the description thereof will not be repeated.

The present inventors conducted a variety of studies about the relation between threaded connection for pipe or tube and anti-misalignment property, shouldering torque, corrosion resistance and adhesiveness of a solid lubricant coating. As a result, the following findings were obtained.

In conventional threaded connections for pipe and tube, although galling resistance is sufficient, an anti-misalignment property is insufficient in some cases. The term misalignment refers to the situation illustrated in FIG. 1. Referring to FIG. 1, to a front end of a steel pipe 1, a coupling 2 is attached. To the other front end of the steel pipe 1, a pin 3 is formed. To a front end of another steel pipe 4, a coupling 5 is attached. On the inner peripheral surface of the coupling 5, a box is formed. The pin 3 of the steel pipe 1 is inserted into the coupling 5, and fastened. This causes the steel pipe 1 to be connected with the steel pipe 4. There are some cases that, in fastening, the longitudinal-direction central axis of the steel pipe 1 and the longitudinal-direction central axis of the steel pipe 4 are not aligned but toe. This is called misalignment. When fastening is performed with misalignment occurring, galling is prone to occur when compared to the case where no misalignment occurs.

To increase the anti-misalignment property of a threaded connection for pipe or tube, it is effective to form a plating layer having a high hardness and a high melting point on a thread portion and an unthreaded metal contact portion (hereafter, referred to as a contact surface). If a plating layer has a high hardness, the plating layer is hard to be damaged in fastening and loosening of a threaded connection for pipe or tube. Furthermore, if a plating layer has a high melting point, the plating layer is hard to be melted out even when the temperature increases locally in fastening and loosening of a threaded connection for pipe or tube.

An alloy plating layer consisting of a Zn—Ni alloy is formed on a contact surface. The Zn—Ni alloy has a high hardness and a high melting point. It is therefore possible to increase the anti-misalignment property of the threaded connection for pipe or tube. The zinc (Zn) in the form of a pure metal has a low hardness and a low melting point as compared with copper (Cu), which is conventionally used for plating. However, using the Zn— Ni alloy allows the plating layer to have a sufficiently high hardness and a sufficiently high melting point, increasing the anti-misalignment property.

Using a Zn—Ni alloy enables the corrosion resistance of a threaded connection for pipe or tube to be increased. Zinc (Zn) is a base metal as compared with iron (Fe), nickel (Ni), and chromium (Cr). Therefore, when the plating layer containing zinc (Zn) is formed on the contact surface, the plating layer corrodes in preference to a steel material (sacrificial protection). This increases the corrosion resistance of the threaded connection for pipe or tube.

Meanwhile, to increase a lubricity, a solid lubricant coating is usually formed on a contact surface of a threaded connection for pipe or tube. The solid lubricant coating may decrease in adhesiveness by repetitive exposure to high temperature and low temperature. The solid lubricant coating having a decreased adhesiveness is scaled off when the threaded connection for pipe or tube is fastened and loosened. In particular, in the case where the fastening is performed with misalignment occurring, the solid lubricant coating is prone to be scaled off. The scaling-off of the solid lubricant coating leads to a reduction in the lubricity of the threaded connection for pipe or tube.

The plating layer usually has a flat surface. Therefore, when the solid lubricant coating is formed on the plating layer, the adhesiveness of the solid lubricant coating is prone to be reduced.

Thus, on the Zn—Ni alloy plating layer, a phosphating layer is formed, and the solid lubricant coating is formed on the phosphating layer. This increases the adhesiveness of the solid lubricant coating. The phosphating layer includes roughness on its surface. When the solid lubricant coating is formed on the surface including roughness, the adhesiveness is increased due to what is called the anchor effect. An increased adhesiveness of the solid lubricant coating suppresses the scaling-off even in the case of repetitive exposure to high temperature and low temperature.

Cu plating and Cu-alloy plating such as a Cu—Sn—Zn alloy used in conventional practice contain Cu as the main component. In this case, a phosphating layer cannot be formed on such plating. For this reason, when the Cu plating or the Cu—Sn—Zn alloy plating is used, the solid lubricant coating needs to be formed directly on the plating layer. In this case, the solid lubricant coating has a low adhesiveness.

Forming the alloy plating consisting of a Zn—Ni alloy and the phosphating layer results in an increased adhesiveness of the solid lubricant coating. An increased adhesiveness of the solid lubricant coating suppresses the scaling-off. If the scaling-off of the solid lubricant coating is suppressed, a high lubricity is kept in fastening and loosening. For this reason, the anti-misalignment property of the threaded connection for pipe or tube is increased.

Figure 2:
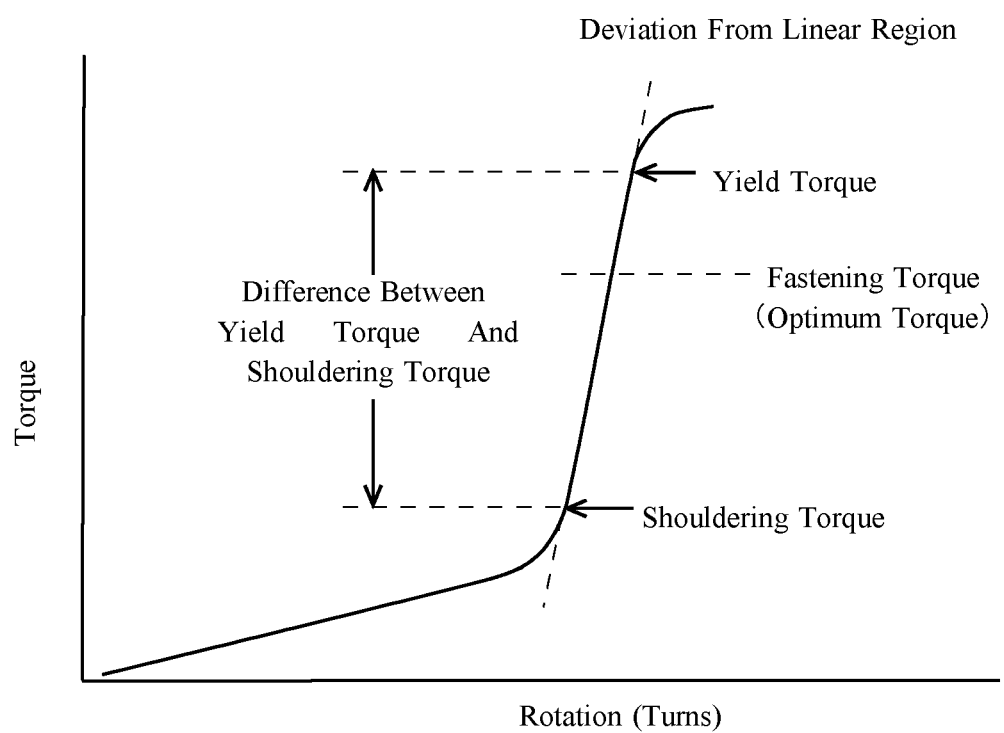
FIG. 2 is a graph illustrating the relation between the number of turns and torque in a threaded connection for pipe or tube.

Furthermore, if a high lubricity of the threaded connection for pipe or tube is kept, a shouldering torque in fastening decreases. FIG. 2 is a graph illustrating the relation between the number of turns and torque in a threaded connection for oil country tubular goods. Referring to FIG. 2, when a pin and a box are fastened, the shoulder portions of the pin and the box come into contact with each other. A torque occurring at this point is called a shouldering torque. In fastening a threaded connection for pipe or tube, after the torque reaches the shouldering torque, the fastening is further performed until fastening is completed. This increases the gas-tightness of the threaded connection for pipe or tube.

A torque at the completion of fastening (fastening torque) is set so that a sufficient seal interfacial pressure can be obtained irrespective of the amount of thread interference. When the difference between a shouldering torque and a yield torque, is sufficiently large, there is room in the range of fastening torque. As a result, the adjustment of the fastening torque becomes easy. Therefore, the shouldering torque is preferably not excessively high. A sufficiently high adhesiveness of the solid lubricant coating allows the shouldering torque to be kept low even when fastening and loosening are repeated. That is, the adjustment of the fastening torque remains easy even after repetitive use.

The threaded connection for pipe or tube according to the present embodiment based on the above findings includes a pin and a box. The pin and the box each include a contact surface having a thread portion and an unthreaded metal contact portion. The threaded connection for pipe or tube includes, on the contact surface of at least one of the pin and the box, an alloy plating layer consisting of a Zn—Ni alloy, a phosphating layer, and a solid lubricant coating. These are stacked in an order of the alloy plating layer, the phosphating layer, and the solid lubricant coating, from a contact surface side.

The threaded connection for pipe or tube according to the present embodiment includes the alloy plating layer consisting of a Zn—Ni alloy. For this reason, the threaded connection for pipe or tube is excellent in anti-misalignment property and corrosion resistance. The threaded connection for pipe or tube according to the present embodiment further includes the phosphating layer under the solid lubricant coating, and thus the adhesiveness of the solid lubricant coating to a threaded connection for pipe or tube is high. Therefore, the threaded connection for pipe or tube according to the present embodiment has a high anti-misalignment property and an appropriate shouldering torque.

The phosphating layer is a preferably manganese phosphating layer. In this case, the adhesiveness of the solid lubricant coating is further increased.

Preferably, the alloy plating layer has a thickness of 1 to 20 μm, the phosphating layer has a thickness of 5 to 20 μm, and the solid lubricant coating has a thickness of 5 to 50 μm.

A method of producing the threaded connection for pipe or tube according to the present embodiment is a method of producing a threaded connection for pipe or tube including a pin and a box. The pin and the box each have a contact surface including a thread portion and an unthreaded metal contact portion. The producing method according to the present embodiment includes an alloy plating layer forming step, a phosphating layer forming step, and a solid lubricant coating forming step. In the alloy plating layer forming step, an alloy plating layer consisting of a Zn—Ni alloy is formed on the contact surface of at least one of the pin and the box. In the phosphating layer forming step, a phosphating layer is formed by performing chemical treatment after forming the alloy plating layer. In the solid lubricant coating forming step, a solid lubricant coating is formed after forming the phosphating layer.

Description will be made below in detail about a threaded connection for pipe or tube and a method of producing a threaded connection for pipe or tube, according to the present embodiment.

[Threaded Connection for Pipe or Tube]

Figure 3:
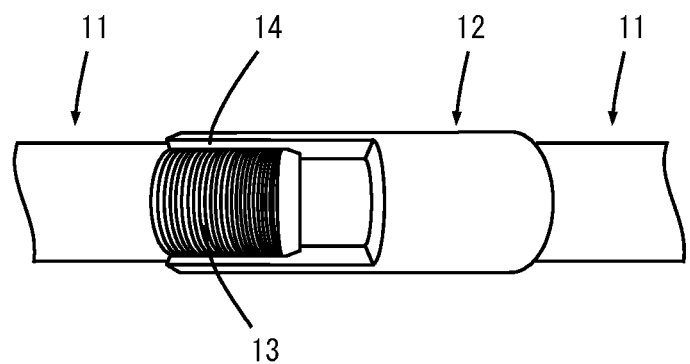
FIG. 3 is a diagram illustrating the configuration of a threaded connection for pipe or tube according to the present embodiment.

A threaded connection for pipe or tube includes a pin and a box. FIG. 3 is a diagram illustrating the configuration of a threaded connection for pipe or tube according to the present embodiment. Referring to FIG. 3, the threaded connection for pipe or tube includes a steel pipe 11 and a coupling 12. At the both ends of the steel pipe 11, a pin 13 is formed that includes an external thread portion on its outer surface. At the both ends of the coupling 12, a box 14 is formed that includes an internal thread portion on its inner surface. By fastening the pin 13 and the box 14, the coupling 12 is attached to the end of the steel pipe 11. Besides, there is an integral-type threaded connection for pipe or tube, which does not include a coupling 12 but includes a pin 13 provided at one end of the steel pipe 11 and a box 14 at the other end. The threaded connection for pipe or tube in the present embodiment is available for both of coupling-type threaded connections for pipe or tube and integral-type threaded connections for pipe or tube.

Figure 4:
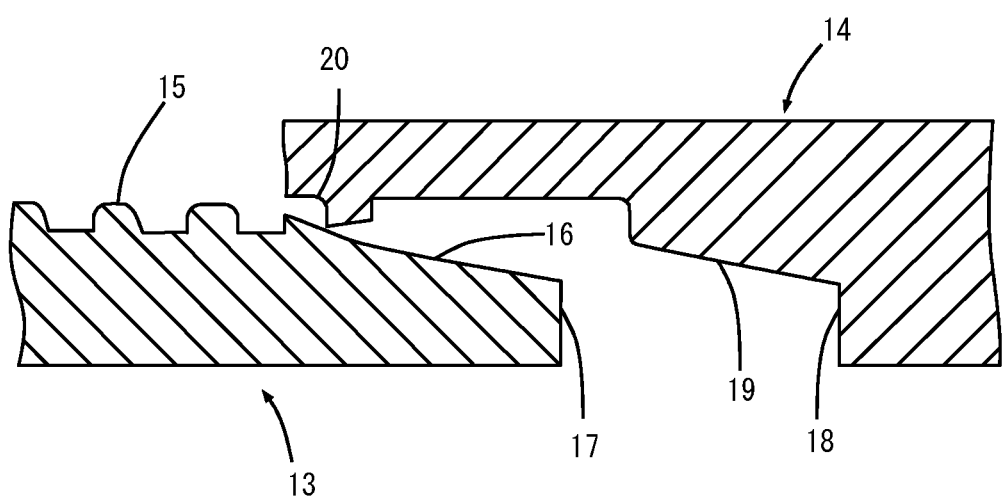
FIG. 4 is a cross-sectional view of the threaded connection for pipe or tube according to the present embodiment.

The pin and the box each have a contact surface including a thread portion and an unthreaded metal contact portion. FIG. 4 is a cross-sectional view of the threaded connection for pipe or tube according to the present embodiment. Referring to FIG. 4, the pin 13 includes external thread 15 and an unthreaded metal contact portion. The unthreaded metal contact portion is formed at a front end of the pin 13, including a metal seal portion 16 and a shoulder portion 17. The portions that come into contact with each other when the pin 13 and the box 14 are fastened refer to as contact surfaces. Specifically, as the pin 13 and the box 14 are fastened, both shoulder portions (the shoulder portions 17 and 18), both metal seal portions (the metal seal portions 16 and 19), and both thread portions (the external thread portion 15 and the internal thread portion 20) come into contact with each other, respectively. That is, the contact surface includes the shoulder portion, the metal seal portion, and the thread portion.

Figure 5:
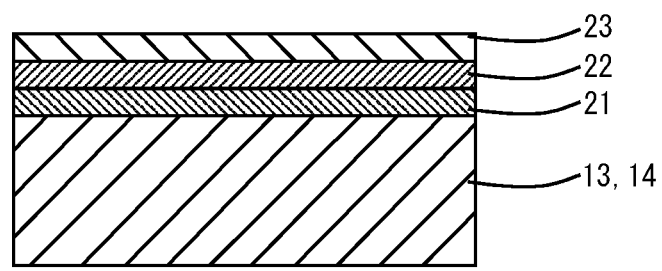
FIG. 5 is a cross-sectional view of a contact surface of the threaded connection for pipe or tube according to the present embodiment.

FIG. 5 is a cross-sectional view of a contact surface of the threaded connection for pipe or tube according to the present embodiment. Referring to FIG. 5, the threaded connection for pipe or tube includes, on the contact surface of at least one of the pin 13 and the box 14, alloy plating layer 21, a phosphating layer 22, and a solid lubricant coating 23. These are stacked in an order of the alloy plating layer 21, the phosphating layer 22, and the solid lubricant coating 23, from a contact surface side.

[Alloy Plating Layer 21]

The alloy plating layer 21 consisting of a Zn—Ni alloy is formed on the contact surface of at least one of the pin and the box. The alloy plating layer 21 has a high hardness and a high melting point. Therefore, the anti-misalignment property of the threaded connection for pipe or tube is increased. Zn contained in the alloy plating layer 21 is a base metal. Therefore, the corrosion resistance of the threaded connection for pipe or tube is increased.

The Zn—Ni alloy includes Zn and Ni, and the balance thereof is consisting of impurities. The impurity are, for example, Fe, S, O, C and the like. Preferred Zn content in the Zn—Ni alloy is 85 mass %, and more preferably 90 mass %. Preferred Ni content in the Zn—Ni alloy is 10 to 15 mass %. The alloy plating layer 21 has a large content of Zn, thus being highly effective in sacrificial protection.

Zn and Ni contents in the Zn—Ni alloy are measured by the following method. Measurement of Zn and Ni content, for example, is carried out by using a hand-held X-ray fluorescence analyzer (Olympus DP2000 (trade name DELTA Premium)). Any four positions (any of 0°, 90°, 180°, and 270° positions on the circumferential direction of a pipe) on a surface of a metal seal portion, which is plated with a Zn—Ni alloy layer, are measured for the composition analysis. The measured content of Zn and Ni is measured by a measurement mode of the alloy.

A thickness of the alloy plating layer 21 is preferably 1 to 20 μm. If the alloy plating layer 21 has a thickness of 1 μm or more, it is possible to increase the anti-misalignment property and the corrosion resistance of the threaded connection for pipe or tube stably. If the alloy plating layer 21 has a thickness of 20 μm or less, the adhesiveness of the plating is stabilized. Therefore, a preferable thickness of the alloy plating layer 21 is 1 to 20 μm.

The thickness of the alloy plating layer 21 is measured by the following method. A probe of an overcurrent phase type film thickness measuring device, conforming to ISO (International Organization for Standardization) 21968 (2005), is contacted to a contact surface formed with an alloy plating layer 21. The phase difference between the high frequency magnetic field on the input side of the probe and the overcurrent, which is raised by the high frequency magnetic field on the alloy plating layer 21, is measured. This phase difference is converted into the thickness of the alloy plating layer 21. In a film thickness measurement on a threaded connection, any four positions (any of 0°, 90°, 180°, 270° positions on the circumferential direction of a pipe) on a metal seal portion are measured.

[Phosphating Layer 22]

The phosphating layer 22 is formed on the alloy plating layer 21. The phosphating layer 22 includes roughness on its surface. The solid lubricant coating 23 is cured while fitting into the roughness, and thus the adhesiveness of the solid lubricant coating 23 is increased. Since the adhesiveness of the solid lubricant coating 23 is high, the durability of the solid lubricant coating is improved. Therefore, even in the case where the threaded connection for pipe or tube is repeatedly used, the scaling-off of the solid lubricant coating 23 is suppressed. Furthermore, the phosphating layer 22 is porous. Therefore, even in the case where the solid lubricant coating wears due to repetitive use of the threaded connection for pipe or tube, portion of the solid lubricant coating 23 or wear debris of the solid lubricant coating 23 remains in the pores of the phosphating layer 22. Therefore, the threaded connection for pipe or tube keeps a high lubricity even when it is used repeatedly.

The phosphating layer 22 contains crystals of a metal phosphate, and the balance thereof is consisting of impurities. The kind of the metal phosphate is not limited in particular. Examples of the metal phosphate include zinc phosphate, iron phosphate, manganese phosphate, and calcium phosphate. The crystals of one of these metal phosphates serve as a coating to form the phosphating layer 22. The phosphating layer 22 is preferably a manganese phosphating layer or a zinc phosphating layer. The manganese phosphating layer is particularly preferable from the view point of porous properties. Using the manganese phosphate for the phosphating layer 22 results in an increased adhesiveness of the solid lubricant coating 23 as compared with the case of using other metal phosphates.

The phosphating layer 22 preferably has a thickness of 5 to 20 μm. If the phosphating layer 22 has a thickness of 5 μm or more, it is possible to obtain the adhesiveness of the solid lubricant coating 23 and an appropriate shouldering torque of the solid lubricant coating 23, stably. In contrast, if the phosphating layer 22 has a thickness more than 20 μm, the above-described effect is saturated. Furthermore, if the phosphating layer 22 has a thickness of 20 μm or less, it is possible to suppress coarsening of crystals of the phosphate and to sufficiently cover the alloy plating layer 21 consisting of a Zn—Ni alloy. Consequently, the phosphating layer 22 preferably has a thickness of 5 to 20 μm. The thickness of the phosphating layer 22 is measured by the same method described in the above-mentioned alloy plating layer 21.

[Solid Lubricating Coating 23]

The solid lubricating coating 23 is formed on the phosphating layer 22. By virtue of the solid lubricating coating 23, the lubricity of the threaded connection for pipe or tube is increased. As the solid lubricating coating 23, well-known ones can be used. The solid lubricating coating 23 contains, for example, a lubricating particle and a binding agent. The solid lubricating coating 23 may contain a solvent and other constituents as necessary.

The lubricating particle reduces the friction coefficient of the surface of the lubricating coating 23. The lubricating particle is not limited in particle as long as the particle has lubricity. The lubricating particle can be, for example, graphite, molybdenum disulfide ($MoS_2$), tungsten disulfide ($WS_2$), boron nitride (BN), polytetrafluoroethylene (PTFE), a graphite fluoride ($CF_x$), calcium carbonate ($CaCO_3$), or a combination thereof. Preferably, graphite, a graphite fluoride, $MoS_2$ and PTFE are used. When the solid lubricant film 23 is set to be 100 mass %, the content of the lubricating particle is preferably 5 to 40 mass %.

The binding agent binds lubricating particle in the lubricating coating 23. As the binding agent, an organic resin, an inorganic resin, or a mixture thereof can be used. In the case of using the organic resin, a thermosetting resin or a thermoplastic resin can be used. The thermosetting resin includes, for example, an epoxy resin, a polyimide resin, a polycarbodiimide resin, a polyethersulfone resin, a polyetheretherketone resin, phenolic resin, a furan resin, a urea resin, and an acrylic resin. The thermoplastic resin includes, for example, a polyamide-imide resin, a polyethylene resin, a polypropylene resin, a polystyrene resin, and an ethylene vinyl acetate resin. When the solid lubricant film 23 is set to be 100 mass %, the content of the binding agent is preferably 60 to 95 mass %.

In the case of using an inorganic resin, a polymetaloxane can be used. The polymetaloxane refers to a high polymer having a main chain skeleton made of repeating metaloxygen bondings. Preferably, polytitanoxane (Ti—O) and polysiloxane (Si—O) are used. These inorganic resins are obtained by subjecting metal alkoxides to hydrolysis and condensation. The alkoxy group of the metal alkoxide is, for example, a lower alkoxy group such as methoxy group, ethoxy group, propoxy group, isopropoxy group, isobutoxy group, butoxy group, and tert-butoxy group.

When there is a need for dissolving or dispersing the lubricating particles and the binding agent, a solvent is used. The solvent is not limited in particular as long as it can subject constituents contained in the lubricating coating 23 to dispersion or dissolution. As the solvent, an organic solvent or water can be used. Examples of the organic solvent include toluene and isopropyl alcohol.

The solid lubricating coating 23 can contain other constituents as necessary. Examples of the other constituents include an anticorrosion, a corrosion inhibitor, a surfactant, a wax, a friction modifier, a pigment, and the like. The contents of the lubricating particles, the binding agent, the solvent, and the other constituents are set as appropriate.

The solid lubricant coating 23 preferably has a thickness of 5 to 50 μm. If the solid lubricant coating 23 has a thickness of 5 μm or more, it is possible to obtain a high lubricity stably. Meanwhile, if the solid lubricant coating 23 has a thickness of 50 μm or less, the adhesiveness of the solid lubricant coating 23 is stabilized. Furthermore, if the solid lubricant coating 23 has a thickness of 50 μm or less, the thread tolerance (clearance) of a sliding surface is widened, which reduces an interfacial pressure in sliding. For this reason, it is possible to suppress a fastening torque becoming excessively high. Consequently, the solid lubricant coating 23 preferably has a thickness of 5 to 50 μm.

The thickness of a solid lubricating coating layer 23 is measured by the following method. Under the same conditions as in the case of applying a solid lubricant coating layer 23 to a threaded connection for pipe or tube, a solid lubricant film is applied on a flat plate. Among the coating conditions of a threaded connection for pipe or tube and flat plate, the following conditions are to be matched; the distance between an object to be coated and a nozzle tip, injection pressure, viscosity of the composition, rotational speed of the object to be coated, and the like. To match the viscosity of the composition, the temperatures of a tank, a pipe, and a nozzle outlet, are to be matched between the threaded connection for pipe or tube and the plate. From the difference of the weight of the plate before applying the composition and the weight of the plate after applying the composition, the amount of the applied amount of the composition per unit time is calculated. The composition is solidified on the plate to form a solid lubricating coating layer 23. The thickness of the solid lubricating coating layer 23 is measured using a film thickness meter. From the difference of the weight of the plate before applying the composition and the weight of the plate after applying the composition, the weight of the solid lubricating coating layer 23 is calculated. From the film thickness and the weight of the solid lubricant coating layer 23, the density of the solid lubricant coating layer 23 is calculated. Next, from the thread shape and the size (inner diameter and thickness, and the like), the application target area of the threaded connection for pipe or tube is calculated. The application target area corresponds to the area of expanding the thread forming surface having unevenness into a plane surface. From the application time of the composition onto the threaded connection for pipe or tube, the application target area, and the density of and the solid lubricant coating layer 23, the average thickness of the solid lubricant coating layer 23 against the threaded connection for pipe or tube is calculated.

[Base Material of Threaded Connection for Pipe or Tube]

The composition of a base material of the threaded connection for pipe or tube is not limited in particular. The base material includes carbon steels, stainless steels, and alloy steels. Among the alloy steels, high alloy steels such as two-phase stainless steels containing an alloying element such as Cr, Ni, and Mo and Ni alloys have a high corrosion resistance. For this reason, using these high alloy steels as the base material results in an excellent corrosion resistance in a corrosive environment containing hydrogen sulfide, carbon dioxide, and the like.

[Producing Method]

A method of producing a threaded connection for pipe or tube according to the present embodiment includes an alloy plating layer forming step, a phosphating layer forming step, and a solid lubricant coating forming step. The steps are performed in the order of the alloy plating layer forming step, the phosphating layer forming step, and the solid lubricant coating forming step. In the producing method, a pretreatment step may be included before the alloy plating layer forming step, as necessary.

[Alloy Plating Layer Forming Step]

In the alloy plating layer forming step, an alloy plating layer 21 consisting of a Zn—Ni alloy is formed on the contact surface of at least one of the pin 13 and the box 14. The alloy plating layer 21 is formed by electroplating. The electroplating is performed in such a manner that the contact surface of at least one of the pin 13 and the box 14 is immersed in a plating bath containing zinc ions and nickel ions, and turned on the electricity. As the plating bath, a commercial one is available. The plating bath preferably contains zinc ion: 1 to 100 g/L and nickel ion: 1 to 50 g/L. The conditions for the electroplating can be set as appropriate. The electroplating conditions are, for example, plating bath pH: 1 to 10, plating bath temperature: 10 to 60° C., a current density: 1 to 100 A/dm$^2$, and treatment time period: 0.1 to 30 minutes.

[Phosphating Layer Forming Step]

After the alloy plating layer forming step, the phosphating layer forming step is performed. The phosphating layer forming step can be performed by well-known phosphate chemical treatment. For example, a bath in which the previously described metal phosphate dissolved in water is prepared. The prepared bath is heated, and the pin 13 or the box 14 with the alloy plating layer 21 formed thereon is immersed in the bath for a certain period of time. The phosphating layer 22 is thereby formed on the alloy plating layer 21. The bath used in the phosphating layer forming step preferably contains a metal phosphate of 50 to 200 g/L. The conditions for the phosphate chemical treatment can be set as appropriate. The phosphate chemical treatment conditions are, for example, bath temperature: 45 to 90° C. and treatment time period: 2 to 10 minutes.

[Solid Lubricant Coating Forming Step]

After the phosphating layer forming step, the solid lubricant coating forming step is performed. In the solid lubricating coating forming step, a composite for forming a solid lubricating coating (hereafter, also referred to as a composite) is first prepared. The composite is formed by mixing the previously described lubricating particle and binding agent. The composite may further contain the previously described solvent or other constituents.

The resultant composite is applied to the phosphating layer 22. A method of the application is not limited in particular. For example, the composite containing the solvent is sprayed on the phosphating layer 22 using a spray gun. This makes the composite applied on the phosphating layer 22 uniformly. The pin 13 or the box 14 on which the composite is applied is subjected to drying by heating. The drying by heating is performed by a commercially available direct drying equipment or the like. This makes the composite cured to form on the solid lubricant coating 23 on the phosphating layer 22. Conditions for the drying by heating can be set as appropriate with the boiling point, melting point, and the like of each constituent contained in the composite taken into consideration.

For a composite not containing the solvent, a hot melt method can be used. In the hot melt method, the composite is heated to get into a fluid state. The composite in the fluid state is sprayed with a spray gun having a temperature maintaining function. The composite is thereby applied on the phosphating layer 22 uniformly. The heating temperature of the composite can be set as appropriate with the melting point and the softening temperature of the previously described binding agent and other constituents taken into consideration. The pin 13 or the box 14 on which the composite is applied is cooled by air cooling or the like. This makes the composite cured to form on the solid lubricant coating 23 on the phosphating layer 22.

[Pretreatment Step]

In the previously described producing steps, a pretreatment step may be included before the alloy plating layer forming step, as necessary. Examples of the pretreatment step include pickling and alkaline degreasing. In the pretreatment step, oil content and the like adhered to the contact surface is cleaned off. The pretreatment step may further include grinding processing such as mechanical grinding finishing.

EXAMPLES

Examples will be described below. In the examples, the contact surface of a pin will be referred to as a pin surface, and the contact surface of a box will be referred to as a box surface. In addition, the sign "%" in the examples means mass percent.

In the present examples, a threaded steel pipe called VAM21 (R) from NIPPON STEEL & SUMITOMO METAL CORPORATION was used. VAM21 (R) was a threaded connection for pipe or tube having an outer diameter of 24.448 cm (9⅝ inches), and a wall thickness of 1.199 cm (0.472 inches). The steel grade was a carbon steel or a high-Cr steel. The composition of a carbon steel was C: 0.21%, Si: 0.25%, Mn: 1.1%, P: 0.02%, S: 0.01%, Cu: 0.04%, Ni: 0.06%, Cr: 0.17%, and Mo: 0.04%, and the balance: Fe and impurities. The composition of a high-Cr steel was C: 0.18%, Si: 0.23%, Mn: 0.8%, P: 0.02%, S: 0.01%, Cu: 0.04%, Ni: 0.1%, Cr: 13%, and Mo: 0.04%, and the balance: Fe and impurities.

A pin surface and a box surface of each test number is used were subjected to the mechanical grinding finishing (at a surface roughness of 3 μm). Subsequently, plating layers or a coating shown in Table 1 was formed, so as to prepare the pin and the box of each test number.

layer formed thereon was immersed in manganese phosphate chemical treatment liquid at 80 to 95° C. for ten minutes, whereby a manganese phosphating layer having a thickness of 12 μm (at a surface roughness of 10 μm) was formed. On the box surface with the manganese phosphating layer formed thereon, a composite for forming a solid lubricant coating was applied. The composite for forming a solid lubricant coating contained a polyamide-imide resin, pure water, dimethyl sulfoxide (DMSO), and a PTFE particle. The composite for forming a solid lubricant coating was sprayed to be applied on the box surface, and then subjected to drying by heating to form the solid lubricant coating. As the drying by heating, predrying (at 85° C. for

TABLE 1

| Test Number | Steel Grade | | Plating Layer (Thickness (μm)) | Phosphating Layer (Thickness (μm)) | Solid Lubricant Coating (Thickness (μm)) | Others |
|---|---|---|---|---|---|---|
| 1 | Carbon Steel | Pin Surface | — | Zinc Phosphating Layer (8 μm) | — | UV Cured Resin Coating (25 μm) |
| | | Box Surface | Zn—Ni Alloy Plating Layer (8 μm) | Manganese Phosphating Layer (12 μm) | Solid Lubricant Coating (30 μm) | — |
| 2 | High-Cr Steel | Pin Surface | Zn—Ni Alloy Plating Layer (8 μm) | Manganese Phosphating Layer (12 μm) | Solid Lubricant Coating (30 μm) | — |
| | | Box Surface | Zn—Ni Alloy Plating Layer (8 μm) | Manganese Phosphating Layer (12 μm) | Solid Lubricant Coating (30 μm) | — |
| 3 | Carbon Steel | Pin Surface | — | Zinc Phosphating Layer (8 μm) | — | UV Cured Resin Coating (25 μm) |
| | | Box Surface | — | Manganese Phosphating Layer (12 μm) | Solid Lubricant Coating (30 μm) | — |
| 4 | Carbon Steel | Pin Surface | — | Zinc Phosphating Layer (8 μm) | — | UV Cured Resin Coating (25 μm) |
| | | Box Surface | Cu—Sn—Zn Alloy Plating Layer (8 μm) | — | Solid Lubricant Coating (30 μm) | — |
| 5 | Carbon Steel | Pin Surface | — | Zinc Phosphating Layer (8 μm) | — | UV Cured Resin Coating (25 μm) |
| | | Box Surface | Zn—Ni Alloy Plating Layer (8 μm) | — | Solid Lubricant Coating (30 μm) | — |
| 6 | High-Cr Steel | Pin Surface | Zn—Ni Alloy Plating Layer (8 μm) | — | Solid Lubricant Coating (30 μm) | |
| | | Box Surface | Nitrided Layer (2 μm) | Manganese Phosphate Coating (12 μm) | Solid Lubricant Coating (30 μm) | — |
| 7 | Carbon Steel | Pin Surface | — | Zinc Phosphating Layer (8 μm) | — | UV Cured Resin Coating (25 μm) |
| | | Box Surface | Fe Plating Layer (1.5 μm) | Manganese Phosphating Layer (12 μm) | Solid Lubricant Coating (30 μm) | — |

The method of forming plating layers or coatings is as follows.

[Test Number 1]

For the test number 1, the following treatment was performed on a carbon steel. A box surface was plated with Zn—Ni alloy plating (Daiwa Fine Chemicals Co., Ltd.) by electroplating, so as to form an alloy plating layer having a thickness of 8 μm. The conditions for the electroplating were plating bath pH: 6.5, plating bath temperature: 25° C., current density: 2 A/dm$^2$, and treatment time period: 18 minutes. The composition of the alloy plating layer was Zn: 85% and Ni: 15%. The box surface with the alloy plating ten minutes) and drying (at 280° C. for 30 minutes) were performed. The obtained solid lubricant coating had an average film thickness of 30 μm.

The pin surface was immersed in a zinc phosphate chemical treatment bath at 75 to 85° C. for ten minutes, whereby a zinc phosphating layer having a thickness of 8 μm (at a surface roughness of 5 μm) was formed. Furthermore, on the resultant zinc phosphating layer, a composite for forming a UV cured resin coating was applied. The composite for forming a UV cured resin coating contained an acrylic-resin-based UV cured resin, aluminum phosphite, and a polyethylene wax, at a ratio of 1:0.05:0.01. The aluminum phosphite is an anticorrosion, and the polyethylene wax is a lubricant. The applied composite for forming a UV cured resin coating was irradiated with ultraviolet light to form a UV cured resin coating having a thickness of 25 μm. The resultant UV cured resin coating was colorless and transparent. The conditions for the ultraviolet light irradiation were as follows.

UV lamp: Air-cooled mercury lamp
UV lamp output: 4 kW
Ultraviolet light wavelength: 260 nm

[Test Number 2]

For the test number 2, the following treatment was performed on a high-Cr steel. An alloy plating layer, a manganese phosphating layer, and a solid lubricant coating were formed on a pin surface and a box surface, as with the box surface of the test number 1. The resultant alloy plating layer and the coatings had the same thicknesses as those of the box surface of the test number 1. The resultant alloy plating layer had the same composition as that of the box surface of the test number 1.

[Test Number 3]

For the test number 3, the following treatment was performed on a carbon steel. A Zinc phosphating layer and a UV cured resin coating were formed on a pin surface, as with the pin surface of the test number 1. The formed coatings had the same thicknesses as those of the test number 1. A Manganese phosphating layer and a solid lubricant coating were formed on a box surface, as with the test number 1. The resultant coatings had the same thicknesses as those of the box surface of the test number 1. However, the alloy plating layer was not formed on the box surface of the test number 3.

[Test Number 4]

For the test number 4, the following treatment was performed on a carbon steel. A Zinc phosphating layer and a UV cured resin coating were formed on a pin surface, as with the pin surface of the test number 1. The formed coatings had the same thicknesses as those of the test number 1. On the box surface, a Cu—Sn—Zn alloy plating layer was formed. As a plating bath, a plating bath made by NIHON KAGAKU SANGYO CO., LTD. was used. The Cu—Sn—Zn alloy plating layer was formed by electroplating. The conditions for the electroplating were plating bath pH: 14, plating bath temperature: 45° C., a current density: 2 A/dm$^2$, and treatment time period: 40 minutes. The Cu—Sn—Zn alloy plating layer had a thickness of 8 μm. The composition of the Cu—Sn—Zn alloy plating layer was Cu: about 63%, Sn: about 30%, and Zn: about 7%. Subsequently, as with test number 1, a solid lubricant coating was formed. The resultant solid lubricant coating had the same thickness as that of test number 1. However, the phosphating layer was not formed on the box surface of the test number 4 because the phosphating layer could not be formed on the box surface.

[Test Number 5]

For the test number 5, the following treatment was performed on a carbon steel. A Zinc phosphating layer and a UV cured resin coating were formed on a pin surface, as with the pin surface of the test number 1. The formed coatings had the same thicknesses as those of the test number 1. On a box surface, an alloy plating layer was formed as with the box surface of the test number 1, and then, without a manganese phosphating layer formed thereon, the same solid lubricant coating as that of the box surface of the test number 1 was formed. The resultant alloy plating layer and the solid lubricant coating had the same thicknesses as those of the box surface of the test number 1. The resultant alloy plating layer had the same composition as that of the box surface of the test number 1.

[Test Number 6]

For the test number 6, the following treatment was performed on a high-Cr steel. On a pin surface, an alloy plating layer was formed as with the box surface of the test number 1, and then, without a manganese phosphating layer formed thereon, the same solid lubricant coating as that of the box surface of the test number 1 was formed. The resultant alloy plating layer and the solid lubricant coating had the same thicknesses as those of the box surface of the test number 1. The resultant alloy plating layer had the same composition as that of the box surface of the test number 1. On a box surface, in place of the alloy plating layer on the box surface of the test number 1, a nitrided layer was formed by nitriding (a low-temperature salt-bath nitriding method), and then a manganese phosphating layer and a solid lubricant coating were formed as with the box surface of the test number 1. The resultant nitrided layer had a thickness of 2 μm, and the coatings had the same thicknesses as those of the box surface of the test number 1.

[Test Number 7]

For the test number 7, the following treatment was performed on a carbon steel. A Zinc phosphating layer and a UV cured resin coating were formed on a pin surface, as with the pin surface of the test number 1. The formed coatings had the same thicknesses as those of the test number 1. On a box surface, a Fe plating layer was formed by electroplating, and the Fe plating layer had a thickness of 1.5 μm. The composition of the Fe plating bath was 250 g/l FeSO$_4$.7H$_2$O, 42 g/l FeCl$_2$. 4H$_2$O, 20 g/l NH$_4$Cl. The conditions for the electroplating were current density: 10 A/dm$^2$, and treatment time period: 60 seconds. A manganese phosphating layer and a solid lubricant coating were formed on the Fe plating layer, as with the box surface of the test number 1. The resultant coatings had the same composition as those of the box surface of the test number 1.

[Anti-Misalignment Property Evaluation Test]

The repetition of fastening and loosening with misalignment was performed on the pins and the boxes of the test number 1 to the test number 7 to evaluate the anti-misalignment property. A toe angle θ of the misalignment was 5°. The fastening and the loosening were repeated up to ten times. A fastening speed in the fastening and the loosening was 10 rpm, and a fastening torque was 42.8 kN·m. Everytime a set of the fastening and the loosening was performed, a pin surface and a box surface were observed visually. Through the visual observation, occurrences of galling were checked. When the galling was slight and thus repairable, a galling flaw was repaired, and the test was continued. The number of times up to which the fastening and the loosening succeeded without unrepairable galling occurring was measured. Table 2 shows the results.

[Salt Spray Test]

A salt spray test was conducted on the box surfaces of the test number 1 to the test number 7. The salt spray test was conducted based on the method described in JIS Z2371 (2000). The specimens had a size of 70 mm×150 mm, and a thickness of 1 mm. Through visual observation, a time point at which red rust occurred on the surface of the specimen of each test number was measured. Table 2 shows the results.

[Protector Install/Uninstall Test]

The adhesiveness of a solid lubricant coating was evaluated using the boxes of the test number 1 to the test number 7. Specifically, a protector was installed on the box of each test number, and the box was in storage at −40° C. for 24 hours, and then at 70° C. for 24 hours. Furthermore, installing and uninstalling of the protector were repeated three times at a room temperature (20° C.). Subsequently, visual observation was performed to check for the presence/absence of the scaling-off of the solid lubricant coating. Furthermore, the scaling-off area of the solid lubricant coating was determined through image processing. Specifically, the box surface having been subjected to the test was photographed, and the resultant image was subjected to binarize processing. The areas of portions equivalent to scaling-off spots were summed in the form of a scaling-off area. Table 2 shows the results.

was scaled-off at an area fraction of more than 10%, accordingly showing a low adhesiveness of the solid lubricant coating.

The phosphating layer was not formed on the box surface of the test number 5. Therefore, slight galling occurred at the sixth fastening and loosening with misalignment, and unrepairable galling occurred at the seventh, accordingly showing a low anti-misalignment property. Furthermore, after the protector install/uninstall test, the solid lubricant coating was scaled off at an area fraction of more than 10%, accordingly showing a low adhesiveness of the solid lubricant coating.

TABLE 2

| Test Number | Occurrences Of Galling1) (Value: The Number Of Fastening) | | | | | | | | | | Salt Spray Test Compliant With (JIS Z2371: 2000) (2000 Hours) 2) | Protector Install/Uninstall Test 3) |
|---|---|---|---|---|---|---|---|---|---|---|---|---|
| | 1 | 2 | 3 | 4 | 5 | 6 | 7 | 8 | 9 | 10 | | |
| 1 | ○ | ○ | ○ | ○ | ○ | ○ | ○ | ○ | ○ | ○ | No Rust | No Coating Scaling-off |
| 2 | ○ | ○ | ○ | ○ | ○ | ○ | ○ | ○ | ○ | ○ | No Rust | No Coating Scaling-off |
| 3 | ○ | X | — | — | — | — | — | — | — | — | Rusting After 100 Hours | Low Degree Of Coating Scaling-off |
| 4 | ○ | ○ | ○ | ○ | ○ | Δ | X | — | — | — | Rusting After 750 Hours | High Degree Of Coating Scaling-off |
| 5 | ○ | ○ | ○ | ○ | ○ | Δ | X | — | — | — | No Rust | High Degree Of Coating Scaling-off |
| 6 | ○ | ○ | ○ | X | — | — | — | — | — | — | Rusting (Pitting) After 500 Hours | No Coating Scaling-off |
| 7 | ○ | ○ | X | — | — | — | — | — | — | — | Rusting After 150 Hours | Low Degree Of Coating Scaling-off |

(Note)
1) ○: No Galling, Δ: Slight (Refastening Can Be Performed After Repairing Galling Flaws), X: Significant (Unrepairable), —: Test Ended For 1500 Hours Or More
2) It Was Determined That There Was No Problem With Anticorrosion Property In Long Term Storage If No Rust Occurred
3) Low Degree Of Coating Scaling-off: Scaling-off Area Fraction Of 5-10%, High Degree Of Coating Scaling-off: Scaling-off Area Fraction > 10%

[Evaluation Results]

Referring to Table 1 and Table 2, the threaded connections for pipe and tube of the test number 1 and the test number 2 each included the alloy plating layer, the phosphating layer, and the solid lubricant coating on the contact surface of at least one of the pin and the box. Therefore, no galling occurred after ten repetitions of fastening and loosening with misalignment, showing excellent anti-misalignment properties. The threaded connections for pipe and tube of the test number 1 and the test number 2 each included the alloy plating layer consisting of a Zn—Ni alloy. Therefore, no rust occurred after the continuation of the salt spray test for 2000 hours, showing excellent corrosion resistance. The threaded connections for pipe and tube of the test number 1 and the test number 2 each included the phosphating layer. Therefore, no scaling-off of the solid lubricant coating occurred after the protector install/uninstall test, showing excellent adhesiveness of the solid lubricant coating.

In contrast, the alloy plating layer was not formed on the pin and the box surface of the test number 3. Therefore, galling occurred at the second fastening and loosening with misalignment, showing a low anti-misalignment property. Furthermore, rust occurred after the salt spray test for 100 hours, showing low corrosion resistance. After the protector install/uninstall test, the scaling-off of the solid lubricant coating was confirmed, showing a low adhesiveness of the solid lubricant coating.

For the alloy plating layer formed on the box surface of the test number 4, a Cu—Sn—Zn alloy was used in place of a Zn—Ni alloy. Furthermore, in the test number 4, the phosphating layer could not be formed. Therefore, slight galling occurred at the sixth fastening and loosening with misalignment, and unrepairable galling occurred at the seventh, accordingly showing a low anti-misalignment property. Furthermore, rust occurred after the salt spray test for 750 hours, showing low corrosion resistance. After the protector install/uninstall test, the solid lubricant coating On the box surface of the test number 6, the nitrided layer was formed in place of the Zn—Ni alloy plating layer. Therefore, galling occurred at the fourth fastening and loosening with misalignment, showing a low anti-misalignment property. Furthermore, rust occurred (pitting) after the salt spray test for 500 hours, showing low corrosion resistance.

On the box surface of the test number 7, the Fe plating layer was formed in place of the Zn—Ni alloy plating layer. Therefore, galling occurred at the third fastening and loosening with misalignment, showing a low anti-misalignment property. Furthermore, rust occurred after the salt spray test for 150 hours, showing low corrosion resistance.

[Shouldering Torque Measurement Test]

Changes in shouldering torque in the presence/absence of the phosphating layer were measured. First, a pin and a box made of VAM21(R), a high-Cr steel, were prepared. The high-Cr steel used was of steel grade (SM13CrS-110), which is particularly susceptible to galling among high-Cr steels. The size of the VAM21 (R) used had an outer diameter: 17.78 cm (7 inches), and a wall thickness of 1.151 cm (0.453 inch). Using this VAM21 (R), the following treatment was performed on the pin and the box as shown in Table 3.

On each of the pin surfaces of the test number 8 and the test number 9, an alloy plating layer was formed as with the test number 1. The resultant alloy plating layer had the same thickness as that of the test number 1. Subsequently, chromate treatment using trivalent chromate was performed.

On the box surface of the test number 8, an alloy plating layer was formed as with the test number 1. The resultant alloy plating layer had the same thickness as that of the test number 1. Subsequently, the box surface was immersed in a zinc phosphate chemical treatment bath at 75 to 85° C. for ten minutes, whereby a zinc phosphating layer having a thickness of 8 μm (at a surface roughness of 8 μm) was formed. Furthermore, on the box surface with the zinc phosphating layer formed thereon, a composite for forming a solid lubricant coating was applied. The composite for forming a solid lubricant coating contained an epoxy-based resin (22% by mass), a PTFE particle (9% by mass), a solvent (18% by mass in total), water (40% by mass), and other additives (including a pigment) (11% by mass). The composite for forming a solid lubricant coating was sprayed to be applied, and then subjected to drying by heating to form the solid lubricant coating. The obtained solid lubricant coating had an average film thickness of 30 μm.

On the box surface of the test number 9, an alloy plating layer and a solid lubricant coating were formed as with the test number 8. The resultant alloy plating layer and solid lubricant coating had the same thicknesses as those of the test number 8. However, in the test number 9, the phosphating layer was not formed.

The pins and the boxes of the test number 8 and the test number 9 were fastened, and the number of turns and a torque were measured. The measured number of turns and torque were plotted to determine a shouldering torque. Repeating the fastening and loosening seven times, and a shouldering torque is determined every time. From the resultant shouldering torques, the ratio of a shouldering torque with respect to a target fastening torque (ShT %) was calculated. The target fastening torque was set at a constant value. Table 4 shows the results. In the test number 9, unrepairable galling occurred at the fifth fastening and loosening, the subsequent test was not conducted.

number 9. In the test number 8, ShT % was stably low even after the repetitions of fastening and loosening.

In contrast, the phosphating layer was not formed on the pin and the box surface of the threaded connection for pipe or tube of the test number 9. Therefore, ShT % became more than 100% when fastening and loosening were performed, showing a high shouldering torque. In the test number 9, furthermore, unrepairable galling occurred at the fifth fastening and loosening. This reason is estimated that, in the test number 9, the phosphating layer was not formed, and thus the adhesiveness of the solid lubricant coating was low, therefore, the solid lubricant coating was scaled off in the test, and the lubricity of the contact surface was reduced.

As seen from the above, the embodiment according to the present invention has been described. However, the embodiment previously described is merely an example for practicing the present invention. Therefore, the present invention is not limited to the previously-described embodiment, and the previously-described embodiment can be modified and practiced as appropriate without departing from the scope of the present invention.

REFERENCE SIGNS LIST 3, 13 pin
14 box
15, 20 thread portion

TABLE 3

| Test Number | Steel Grade | | Plating Layer (Thickness (μm)) | Phosphating Layer (Thickness (μm)) | Solid Lubricant Coating (Thickness (μm)) | Others |
|---|---|---|---|---|---|---|
| 8 | High-Cr Steel | Pin Surface | Zn—Ni Alloy Plating Layer (8 μm) | — | — | Chromate Treatment |
| | | Box Surface | Zn—Ni Alloy Plating Layer (8 μm) | Zinc Phosphating Layer (8 μm) | Solid Lubricant Coating (30 μm) | — |
| 9 | High-Cr Steel | Pin Surface | Zn—Ni Alloy Plating Layer (8 μm) | — | — | Chromate Treatment |
| | | Box Surface | Zn—Ni Alloy Plating Layer (8 μm) | — | Solid Lubricant Coating (30 μm) | — |

TABLE 4

| Number Of Fastening And Loosening | ShT % Test Number 8 | ShT % Test Number 9 |
|---|---|---|
| 1 | 73% | 156% |
| 2 | 60% | 115% |
| 3 | 66% | 101% |
| 4 | 67% | 137% |
| 5 | 61% | 164% |
| 6 | 61% | — |
| 7 | 61% | — |
| 8 | 60% | — |
| 9 | 55% | — |
| 10 | 55% | — |

Figure 6:
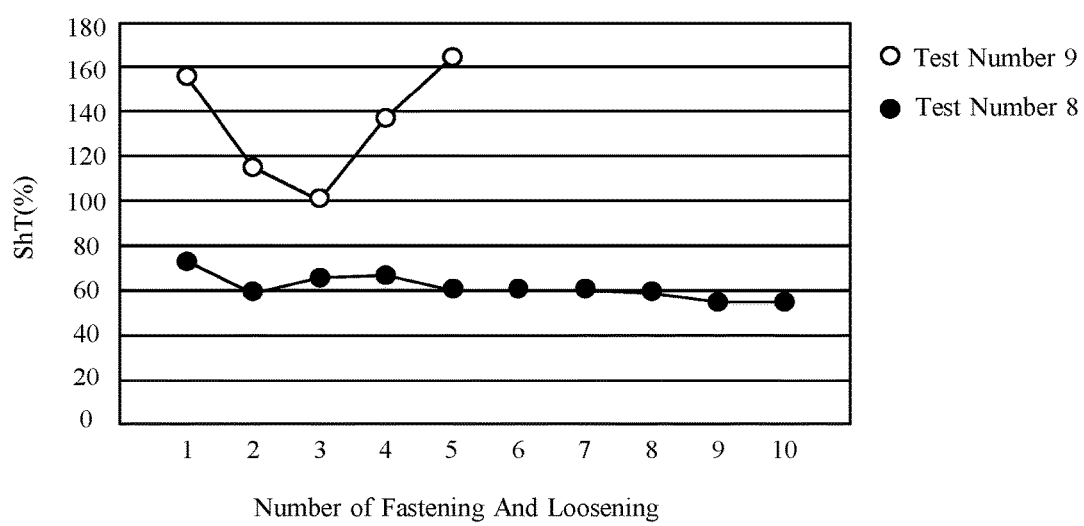
FIG. 6 is a graph made by plotting the results of a shouldering torque measurement test on a test number 8 and a test number 9.

Referring to Table 3 and Table 4, the threaded connection for pipe or tube of the test number 8 included the Zn—Ni alloy plating layer, the phosphating layer, and the solid lubricant coating on the box surface. Therefore, ShT % was about 70% or less after ten repetitions of fastening and loosening, showing a stably low shouldering torque. FIG. 6 is a graph made by plotting the results of a shouldering torque measurement test on a test number 8 and a test 17, 18 shoulder portion
16, 19 metal seal portion
21 alloy plating layer
22 phosphating layer
23 solid lubricating coating

The invention claimed is:

1. A threaded connection for pipe or tube comprising a pin and a box, the pin and the box each including a contact surface that includes a thread portion and an unthreaded metal contact portion, the threaded connection for pipe or tube comprising:
on the contact surface of at least one of the pin and the box,
an alloy plating layer consisting of a Zn—Ni alloy;
a phosphating layer on the alloy plating layer; and
a solid lubricant coating on the phosphating layer.

2. The threaded connection for pipe or tube according to claim 1, wherein the alloy plating layer has a thickness of 1 to 20 μm, the phosphating layer has a thickness of 5 to 20 μm, and the solid lubricant coating has a thickness of 5 to 50 μm.

3. The threaded connection for pipe or tube according to claim 1, wherein the phosphating layer is a manganese phosphating layer.

4. The threaded connection for pipe or tube according to claim 3, wherein the alloy plating layer has a thickness of 1 to 20 μm, the phosphating layer has a thickness of 5 to 20 μm, and the solid lubricant coating has a thickness of 5 to 50 μm.

5. A method of producing a threaded connection for pipe or tube that includes a pin and a box, the pin and the box each including a contact surface that includes a thread portion and an unthreaded metal contact portion, the method comprising the steps of:
   on the contact surface of at least one of the pin and the box,
   forming an alloy plating layer consisting of a Zn—Ni alloy;
   forming a phosphating layer by performing chemical treatment after forming the alloy plating layer; and
   forming a solid lubricant coating after forming the phosphating layer.

\* \* \* \* \*